(12) United States Patent
Yamada et al.

(10) Patent No.: US 8,558,901 B2
(45) Date of Patent: Oct. 15, 2013

(54) VIBRATION COMPENSATION CIRCUIT AND IMAGING DEVICE INCLUDING THE SAME

(75) Inventors: Yoshihisa Yamada, Inazawa (JP); Tomonori Kamiya, Ichinomiya (JP)

(73) Assignees: Sanyo Semiconductor Co., Ltd. (JP); Semiconductor Components Industries, LLC, Phoenix, AZ (US)

( * ) Notice: Subject to any disclaimer, the term of this patent is extended or adjusted under 35 U.S.C. 154(b) by 333 days.

(21) Appl. No.: 12/935,874

(22) PCT Filed: Jul. 7, 2009

(86) PCT No.: PCT/JP2009/063244
§ 371 (c)(1),
(2), (4) Date: Sep. 30, 2010

(87) PCT Pub. No.: WO2010/013647
PCT Pub. Date: Feb. 4, 2010

(65) Prior Publication Data
US 2011/0193977 A1    Aug. 11, 2011

(30) Foreign Application Priority Data
Jul. 31, 2008    (JP) .................... 2008-197631

(51) Int. Cl.
H04N 5/228    (2006.01)
(52) U.S. Cl.
USPC ..................... 348/208.2; 348/208.4
(58) Field of Classification Search
USPC ........ 348/208.99, 208.2, 208.4, 208.5, 208.7, 348/208.11; 396/52, 53
See application file for complete search history.

(56) References Cited

U.S. PATENT DOCUMENTS

| | | | |
|---|---|---|---|
| 5,805,212 A | 9/1998 | Fujiwara | |
| 6,226,124 B1* | 5/2001 | Enomoto et al. | 359/557 |
| 6,374,049 B1* | 4/2002 | Fujinaga | 396/55 |
| 2001/0030275 A1 | 10/2001 | Tsukamoto et al. | |
| 2006/0170388 A1* | 8/2006 | Nomura et al. | 318/685 |

FOREIGN PATENT DOCUMENTS

| | | |
|---|---|---|
| DE | 19947125 A1 | 4/2000 |
| DE | 102006004426 A1 | 8/2006 |
| GB | 601929 A | 5/1948 |

(Continued)

OTHER PUBLICATIONS

International Search Report for International Application No. PCT/JP2009/063244 mailed Nov. 10, 2009 with English translation.

(Continued)

*Primary Examiner* — Nelson D. Hernández Hernández
(74) *Attorney, Agent, or Firm* — Cantor Colburn LLP

(57) ABSTRACT

The present invention comprises: an analog/digital conversion means for converting vibration detection signals output from a vibration detection element that detects vibrations of an imaging device into digital signals; a gyro filter that obtains the amount of movement of the imaging device based on the vibration detection signals digitalized by the analog/digital conversion means; a rotation control means for generating an amount of rotary drive in a stepping motor based on both the current position and amount of movement of an optical component or an imaging element; and a stepping control means for generating and outputting pulse signals that drive the rotation of the stepping motor in each phase according to the amount of rotary drive, wherein the stepping control means enables pulse-width modulation of the ratio between the periods in which high-level pulse signals and low-level pulse signals are respectively applied to the same phase of the stepping motor.

10 Claims, 11 Drawing Sheets

(56) References Cited

FOREIGN PATENT DOCUMENTS

| | | |
|---|---|---|
| GB | 2423159 A | 8/2006 |
| JP | 9-18779 A | 1/1997 |
| JP | 2000-105343 A | 4/2000 |
| JP | 2001-188272 A | 7/2001 |
| JP | 2001-305434 A | 10/2001 |
| JP | 2004-4362 A | 1/2004 |
| JP | 2006-208873 A | 8/2006 |
| JP | 2007-57981 A | 3/2007 |
| JP | 2007-93953 A | 4/2007 |
| KR | 1020060088069 A | 8/2006 |

OTHER PUBLICATIONS

Notice of Grounds for Rejection for Japanese Patent Application No. 2008-197631, mailed May 7, 2013, with English translation.

* cited by examiner

| PHASE | A PHASE | B PHASE | DUTY OF OFF PERIOD | | | |
|---|---|---|---|---|---|---|
| (ROTATIONAL ANGLE) | CURRENT | CURRENT | A PHASE-1 | A PHASE-2 | B PHASE-1 | B PHASE-2 |
| 0° | 100% | 0% | 0% | 100% | 100% | 100% |
| 22.5° | 92% | 38% | 0% | 92% | 0% | 38% |
| 45° | 71% | 71% | 0% | 71% | 0% | 71% |
| 67.5° | 38% | 92% | 0% | 38% | 0% | 92% |
| 90° | 0% | 100% | 100% | 100% | 0% | 100% |
| 112.5° | -38% | 92% | 38% | 0% | 0% | 92% |
| 135° | -71% | 71% | 71% | 0% | 0% | 71% |
| 157.5° | -92% | 38% | 92% | 0% | 0% | 38% |
| 180° | -100% | 0% | 100% | 0% | 100% | 100% |
| 202.5° | -92% | -38% | 92% | 0% | 38% | 0% |
| 225° | -71% | -71% | 71% | 0% | 71% | 0% |
| 247.5° | -38% | -92% | 38% | 0% | 92% | 0% |
| 270° | 0% | -100% | 100% | 100% | 100% | 0% |
| 292.5° | 38% | -92% | 0% | 38% | 92% | 0% |
| 315° | 71% | -71% | 0% | 71% | 71% | 0% |
| 337.5° | 92% | -38% | 0% | 92% | 38% | 0% |

FIG. 8

| PHASE | A PHASE | B PHASE | DUTY OF OFF PERIOD | | | |
|---|---|---|---|---|---|---|
| (ROTATIONAL ANGLE) | CURRENT | CURRENT | A PHASE-1 | A PHASE-2 | B PHASE-1 | B PHASE-2 |
| 0° | 50% | 0% | 0% | 50% | 100% | 100% |
| 22.5° | 46% | 19% | 0% | 46% | 0% | 19% |
| 45° | 36% | 36% | 0% | 36% | 0% | 36% |
| 67.5° | 19% | 46% | 0% | 19% | 0% | 46% |
| 90° | 0% | 50% | 100% | 100% | 0% | 50% |
| 112.5° | -19% | 46% | 19% | 0% | 0% | 46% |
| 135° | -36% | 36% | 36% | 0% | 0% | 36% |
| 157.5° | -46% | 19% | 46% | 0% | 0% | 19% |
| 180° | -50% | 0% | 50% | 0% | 100% | 100% |
| 202.5° | -46% | -19% | 46% | 0% | 19% | 0% |
| 225° | -36% | -36% | 36% | 0% | 36% | 0% |
| 247.5° | -19% | -46% | 19% | 0% | 46% | 0% |
| 270° | 0% | -50% | 100% | 100% | 50% | 0% |
| 292.5° | 19% | -46% | 0% | 19% | 46% | 0% |
| 315° | 36% | -36% | 0% | 36% | 36% | 0% |
| 337.5° | 46% | -19% | 0% | 46% | 19% | 0% |

FIG. 9

VIBRATION COMPENSATION CIRCUIT AND IMAGING DEVICE INCLUDING THE SAME

CROSS REFERENCE TO RELATED APPLICATIONS

This is a U.S. national stage application of International Application No. PCT/JP2009/063244, filed on 24 Jul. 2009. Priority under 35 U.S.C. §119(a) and 35 U.S.C. §365(b) is claimed from Japanese Application No. 2008-197631, filed 31 Jul. 2008, the disclosure of which is also incorporated herein by reference.

TECHNICAL FIELD

The present invention relates to a vibration compensation circuit that can be incorporated in an imaging device.

BACKGROUND ART

Recently, imaging devices, such as digital still cameras and digital video cameras, are capable of improving the quality of output images by increasing the number of pixels constituting an image sensor incorporated therein. On the other hand, as another method for enabling an imaging device to output high-quality images, it is desired that the imaging device has a camera-shake correction mechanism for compensating blur of a shooting subject that may be caused when a hand of a user who holds the imaging device shakes.

More specifically, the imaging device is equipped with a detection element, such as a gyro sensor, and is configured to drive an optical component, such as a lens or an image sensor, according to an angular speed component that is caused by the vibration of the imaging device so as to compensate the blur of the shooting subject. Accordingly, even in a state where the imaging device vibrates, an acquired video signal does not include any influence caused by a vibration component. Thus, a high-quality video signal free from image blur can be acquired.

FIG. 13 illustrates a configuration of an imaging device that includes a camera-shake correction driving mechanism using a stepping motor (refer to Japanese Patent Application Laid-Open No. 2006-208873). According to the configuration illustrated in FIG. 13, an X gyro 10 and a Y gyro 12 detect angular speeds of the imaging device that is vibrating. A CPU 14 converts the angular speeds detected by the X gyro 10 and the Y gyro 12 into angular information representing a moving amount of the imaging device. Then, the CPU 14 generates motor driving pulses (i.e., a stepping motor control signal) according to the angular information and outputs the generated motor driving pulses to a motor driver 16. The motor driver 16 generates coil current according to the motor driving pulses to drive a stepping motor 18. An optical component or an image sensor is connected to the stepping motor 18. The driving of the stepping motor 18 can correct the position of the optical component or the image sensor so as to compensate a movement caused by the vibrating imaging device.

A camera-shake correction mechanism using a stepping motor is useful in that the number of components provided in the imaging device is relatively small, compared to a mechanism using a voice coil motor or any other motor. In a case where a voice coil motor is used, the imaging device requires a hall element capable of detecting the position of an optical component (such as a lens) and a signal processing circuit that can process an output signal of the hall element. In a case where a stepping motor is used, the imaging device is not required to include the above-described hall element and the signal processing circuit. Therefore, the cost of the imaging device can be reduced. Further, the stepping motor based camera-shake correction mechanism is different from the voice coil motor based mechanism in the configuration of parts or components and is, therefore, different in the configuration of a control circuit that performs a motor driving control.

SUMMARY OF THE INVENTION

Technical Problem

In general, when an imaging device performs an image capturing operation, it is desired to select a suitable mode for the image capturing operation according to the type of a shooting subject or the like, to perform the image capturing operation under optimum conditions. For example, when a high-quality image capturing operation is performed, it is desired to finely control the position of an optical component or an image sensor to accurately eliminate an adverse influence, such as camera-shake, on the image capturing operation. When a low-quality image capturing operation is performed, it is desired to coarsely control the position of the optical component or the image sensor to speedily accomplish the image capturing operation.

Further, to realize a high-speed control, a vibration compensation system requires an operational mode for increasing the torque of the stepping motor. On the other hand, a power saving mode may also be required to reduce the amount of electric power consumed by the vibration compensation system.

Solution to Problem

According to an aspect of the present invention, a vibration compensation circuit includes an analog/digital conversion unit that converts a vibration detection signal output from a vibration detection element capable of detecting a vibrating state of an imaging device into a digital signal, a gyro filter that generates a moving amount of the imaging device based on the vibration detection signal digitalized by the analog/digital conversion unit, a rotation control unit that generates a driving amount of an optical component or an image sensor based on a present position of the optical component or the image sensor and the moving amount generated by the gyro filter, and a stepping control unit that generates a control signal to be used to control a stepping motor based on the driving amount generated by the rotation control unit and outputs the generated control signal, wherein the analog/digital conversion unit, the gyro filter, and the stepping control unit are integrated as a logic circuit, thereby causing the stepping motor to drive the optical component or the image sensor of the imaging device according to a state of vibration so as to reduce an influence of the vibration on an image capturing operation.

BRIEF DESCRIPTION OF THE DRAWINGS

FIG. 8 is a table illustrating an example of a combination of pulse signals supplied to the stepping motor at respective phases in the stepping motor control performed in units of $\frac{1}{16}^{th}$ of a rotation according to an embodiment of the present invention.

FIG. 9 is a table illustrating an example of a combination of pulse signals supplied to the stepping motor at respective phases in the stepping motor control performed in units of $\frac{1}{16}^{th}$ of a rotation according to a modified embodiment of the present invention, in which the maximum duty is set to 50%.

DESCRIPTION OF EMBODIMENTS

Figure 1:
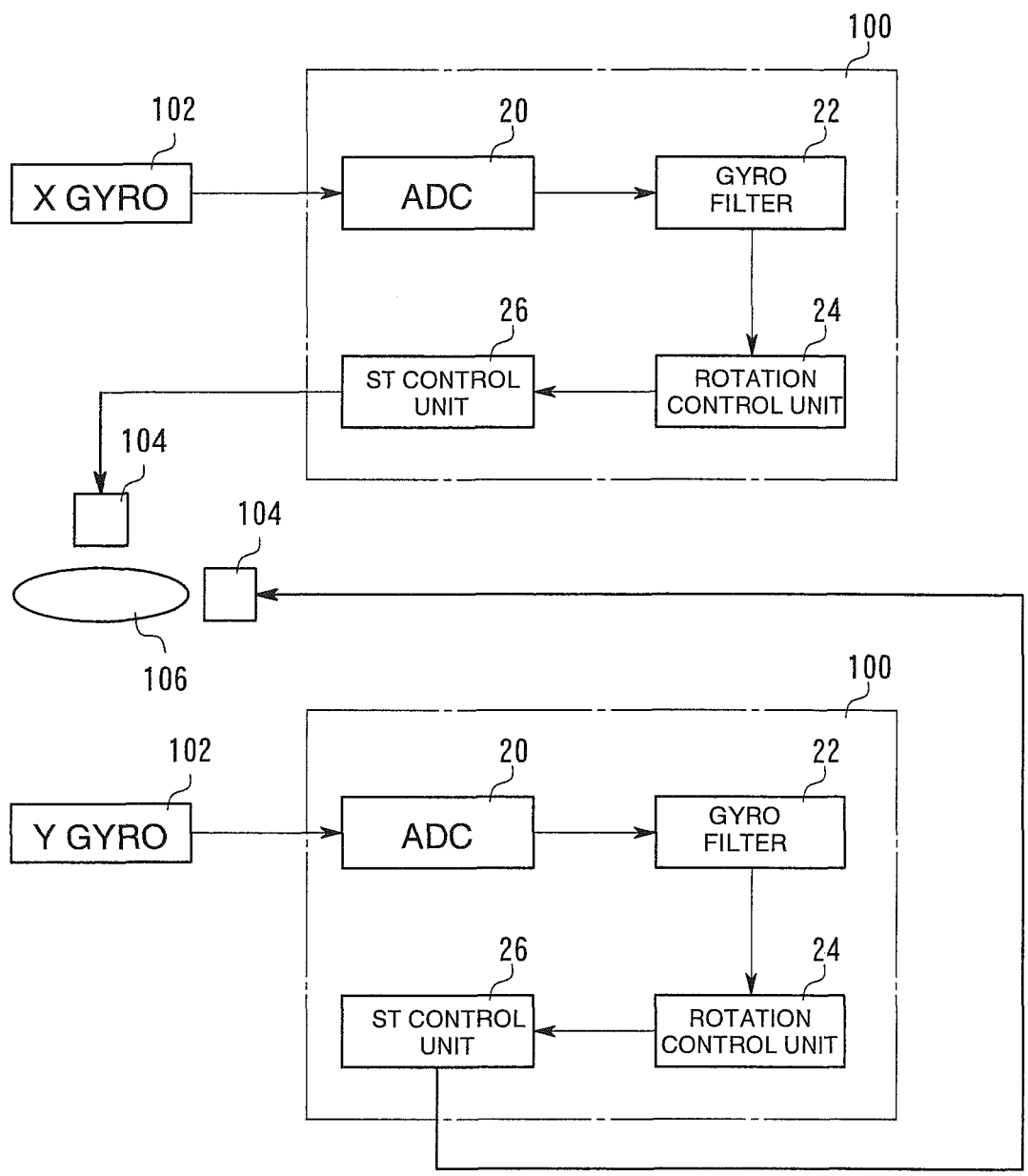
FIG. 1 illustrates a configuration of a vibration compensation circuit according to an embodiment of the present invention.

A vibration compensation circuit 100 according to an embodiment of the present invention includes, as illustrated in FIG. 1, an analog/digital conversion unit (ADC) 20, a gyro filter 22, a rotation control unit 24, and a stepping control unit 26.

The vibration compensation circuit 100 is connected to a vibration detection element 102 and a stepping motor 104. The vibration detection element 102 is provided for each of at least two axes, so that orthogonal transformation of vibration components can be performed along two axes of a yaw direction and a pitch direction. The vibration detection element 102 includes, for example, a gyro sensor. In general, the vibration detection elements 102 are disposed in such a manner that a vibrating state of an imaging device can be detected in both the yaw direction (X-axis direction) and the pitch direction (Y-axis direction). The position of a lens 106 in the yaw direction (X-axis direction) and the pitch direction (Y-axis direction) can be controlled based on output signals of the vibration detection elements 102.

In the following description, the vibration compensation circuit 100 performs control for driving the lens 106 of the imaging device in the X-axis direction. However, the vibration compensation circuit 100 can be provided for each optical component correcting an influence caused by the vibration of the imaging device or for each driving axis of an image sensor. Another vibration compensation circuit that drives the lens 106 of the imaging device in the Y-axis direction or any other axis direction can be configured to have a similar arrangement.

The ADC 20 converts an analog angular speed signal output from the vibration detection element 102, for example, a gyro sensor, into a digital signal. More specifically, the ADC 20 digitalizes and outputs a signal (Gyro-X) representing an X-axis component of the vibration detected by the vibration detection element 102. The ADC 20 outputs the signal (Gyro-X) to the gyro filter 22.

The gyro filter 22 removes a DC component from the angular speed signal (Gyro-X) and extracts an AC component of the angular speed signal that reflects the vibration of the imaging device. A tap filter, which is one of a plurality of types of digital filters, can be used to perform the above-described processing. Further, the gyro filter 22 includes an integrating circuit, which can integrate the angular speed signal (Gyro-X) and generate an angular signal that represents a moving amount of the imaging device. It is desired that the integrating circuit includes a digital filter that performs filter processing according to a filter coefficient having been set beforehand to obtain an angular signal that is delayed by an angular amount 90° from the angular speed signal, i.e., the moving amount of the imaging device. The gyro filter 22 outputs the obtained angular signal to the rotation control unit 24.

Figure 2:
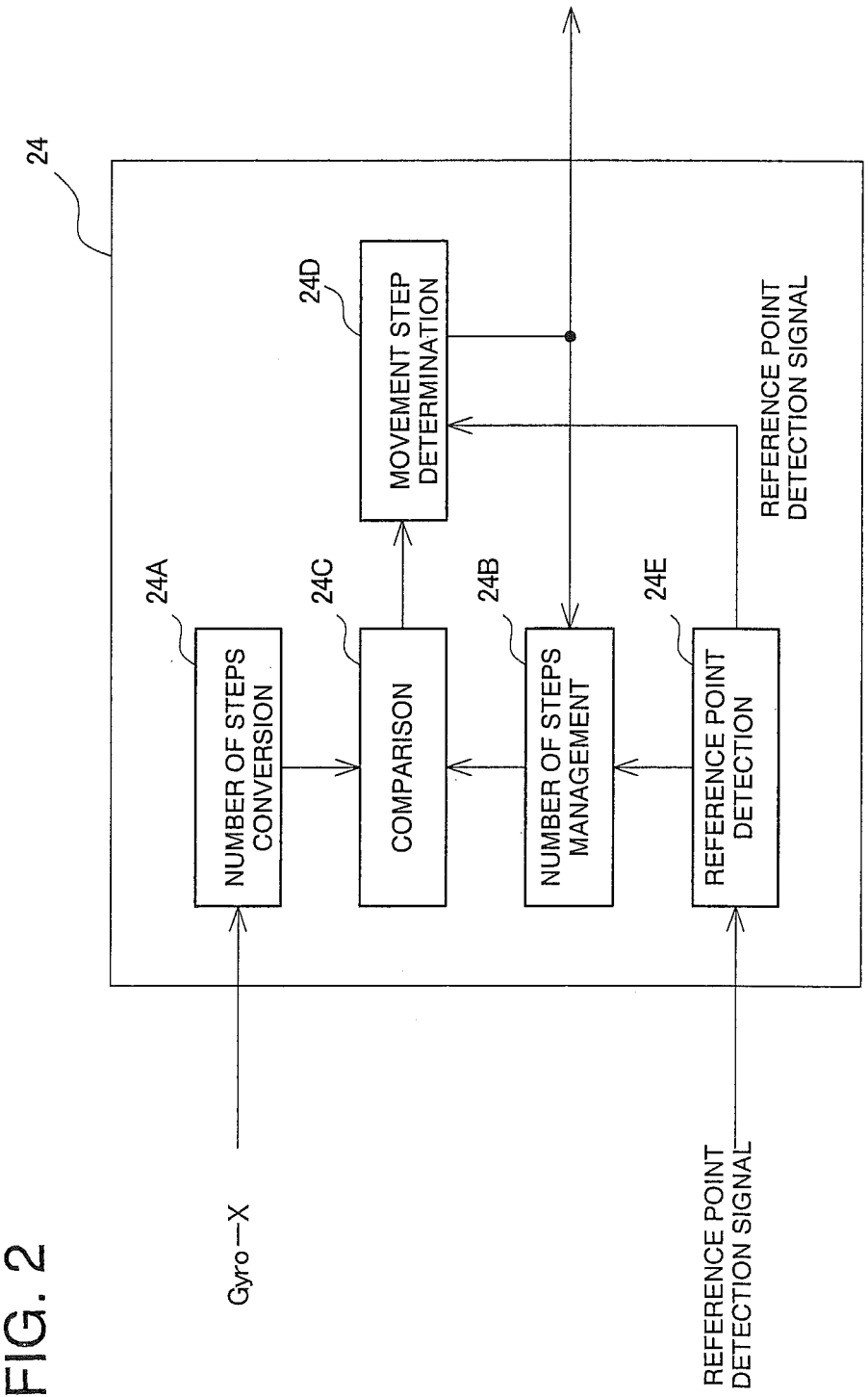
FIG. 2 illustrates a configuration of a rotation control unit according to an embodiment of the present invention.

The rotation control unit 24 includes, as illustrated in FIG. 2, a number of steps conversion module 24A, a number of steps management module 24B, a comparison module 24C, a movement step determination module 24D, and a reference point detection module 24E. The rotation control unit 24 can be realized by a CPU incorporated in the imaging device that can perform each processing of the above-described modules.

First, an initial setting operation to be performed in activation of the imaging device is described below. In the initial setting operation, the reference point detection module 24E receives a reference point discriminating signal from an external device and outputs a reference point detection signal to the number of steps management module 24B and also to the movement step determination module 24D. The movement step determination module 24D outputs an initial number of driving steps that represents an initial driving amount according to the reference point detection signal. The stepping control unit 26 receives the initial number of driving steps from the movement step determination module 24D. The stepping control unit 26 controls the stepping motor 104 to rotate around its rotational shaft by a predetermined number of steps that correspond to the initial number of driving steps. Thus, the lens 106 reaches an initial position, which is generally referred to as an optical origin of the lens 106. An example of processing that can be performed by the stepping control unit 26 is described below in more detail.

Further, at the time when the above-described initial setting operation is completed, the number of steps management module 24B resets a cumulative number of steps to 0. The cumulative number of steps can be referred to as information indicating a present position of the lens 106.

Next, an example of processing that can be performed in a vibration compensation operation when the imaging device performs an image capturing operation is described below. In the vibration compensation operation, the number of steps conversion module 24A receives an angular signal from the gyro filter 22 and obtains a target number of steps based on the received angular signal. The target number of steps can be referred to as information representing a driving amount of the lens 106 that is required to compensate the vibration (i.e., camera-shake). The number of steps conversion module 24A outputs the obtained target number of steps to the comparison module 24C. For example, in a case where the stepping motor 104 can drive the lens 106 from +Nmax step to −Nmax step, as a movable range of the lens 106, and an output value of the gyro filter 22 is variable from +Imax to −Imax, the target number of steps can be obtained based on the output value I of the gyro filter 22 using the following formula. In the following formula, Nmax and Imax are numbers having positive values.

Target number of steps=$I\times(Nmax/Imax)$

The comparison module 24C receives the target number of steps output from the number of steps conversion module 24A and the cumulative number of steps stored in the number of steps management module 24B. The comparison module 24C performs comparison processing with respect to a driving limit position of the lens 106 and further performs comparison processing with respect to a positional range per unit time within which the lens 106 can be driven, based on the received data.

The comparison module 24C obtains a difference in the number of steps that represents a difference between the target number of steps and the cumulative number of steps. The comparison module 24C determines whether the absolute value of the difference in the number of steps exceeds a number of drivable steps that indicates a positional range within which the lens 106 can be driven per unit time. The number of drivable steps can be set beforehand in an internal register of the comparison module 24C. If it is determined that the absolute value of the difference in the number of steps exceeds the number of drivable steps, the comparison module 24C replaces the absolute value of the difference in the number of steps with the number of drivable steps.

Further, the comparison module 24C adds the difference in the number of steps to the cumulative number of steps. Then, the comparison module 24C determines whether a calculation result exceeds an upper-limit number of steps or is less than a lower-limit number of steps. The upper-limit number of steps and the lower-limit number of steps are set beforehand in the internal register as information representing the driving limit position of the lens 106. If it is determined that the calculation result exceeds the upper-limit number of steps, the comparison module 24C subtracts the cumulative number of steps from the upper-limit number of steps and resets a calculation result as the difference in the number of steps. If it is determined that the calculation result is less than the lower-limit number of steps, the comparison module 24C subtracts the cumulative number of steps from the lower-limit number of steps and resets a calculation result as the difference in the number of steps.

The comparison module 24C outputs the processed difference in the number of steps to the movement step determination module 24D.

The movement step determination module 24D receives the difference in the number of steps and outputs the received difference in the number of steps as a driving step number. Further, the number of steps management module 24B receives the driving step number and reads the cumulative number of steps stored in the internal register. Then, the number of steps management module 24B adds the received driving step number to the cumulative number of steps, and updates the value stored in the internal register with a calculation value.

Figure 3:
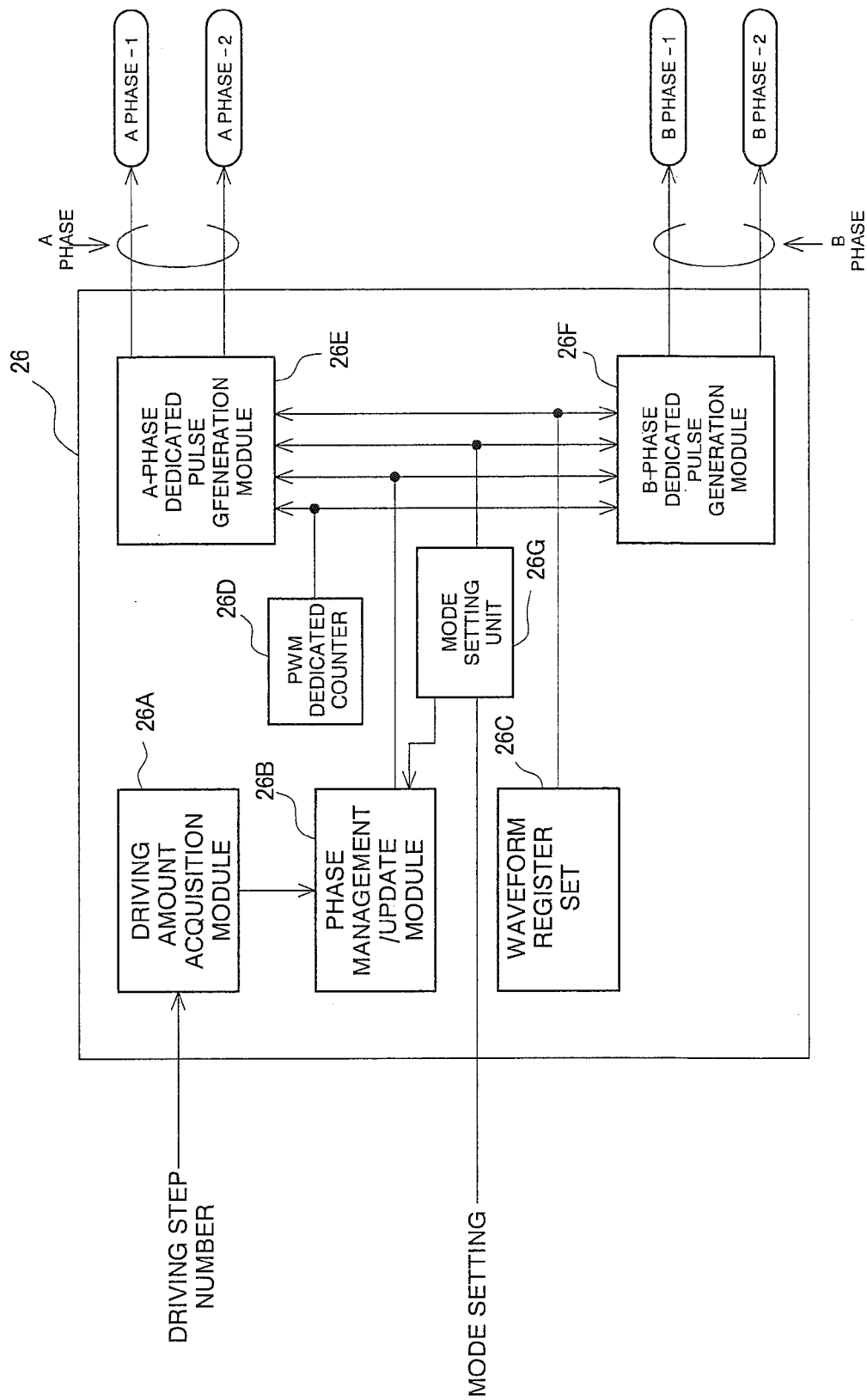
FIG. 3 illustrates a configuration of a stepping control unit according to an embodiment of the present invention.

The stepping control unit 26 includes, as illustrated in FIG. 3, a driving amount acquisition module 26A, a phase management/update module 26B, a waveform register set 26C, a PWM dedicated counter 26D, a A-phase dedicated pulse generation module 26E, a B-phase dedicated pulse generation module 26F, and a mode setting unit 26G. The stepping control unit 26 is an example of a circuit configuration that can drive the stepping motor 104. The stepping control unit 26 can be provided as a controller dedicated to driving the stepping motor 104 in the X-axis direction and can also be provided as a controller dedicated to driving the stepping motor 104 in the Y-axis direction. The X-axis dedicated stepping control unit 26 and the Y-axis dedicated stepping control unit 26 can be configured to perform operations independently.

The driving amount acquisition module 26A is a module that can receive the driving step number output from the rotation control unit 24. The driving amount acquisition module 26A outputs the received driving step number to the phase management/update module 26B.

The phase management/update module 26B performs phase (rotational angle) control to drive the stepping motor 104 based on the received driving step number. The phase management/update module 26B includes an internal register that stores information relating to a present phase (i.e., a rotational angle) of the stepping motor. The phase management/update module 26B can increase and decrease the phase (rotational angle) stored in the internal register and output the increased or decreased phase (rotational angle) to the A-phase dedicated pulse generation module 26E and to the B-phase dedicated pulse generation module 26F.

In the present embodiment, the phase management/update module 26B increases and decreases the driving step number according to a mode having been set for the mode setting unit 26G. While successively increasing and decreasing the phase (rotational angle) of the internal register by an amount corresponding to the driving step number, the phase management/update module 26B outputs the phase information to the A-phase dedicated pulse generation module 26E and to the B-phase dedicated pulse generation module 26F. The driving step number can be increased and decreased according to a ratio of the number of phases during one complete rotation of the stepping motor 104 in the presently set mode to the number of phases during one complete rotation of the stepping motor 104 in a reference mode.

For example, in a case where a mode for controlling one complete rotation of the stepping motor 104 in units of $\frac{1}{8}^{th}$ of a rotation (phase number=8) is set as the reference mode, if a mode for controlling one complete rotation of the stepping motor 104 in units of $\frac{1}{16}^{th}$ of a rotation (phase number=16) is selected, the driving step number is doubled compared to that in the mode for performing the control in units of $\frac{1}{8}^{th}$ of a rotation.

The PWM dedicated counter 26D is a counter that can be used to control the pulse width in performing processing for modulating the pulse width of a pulse signal supplied to the stepping motor 104. The PWM dedicated counter 26D receives a clock signal from an external device and cyclically increases its counter value by one in synchronization with the received clock signal, and outputs the counter value. In the present embodiment, the PWM dedicated counter 26D cyclically increases the counter value by one from 0 to 255 and outputs the counter value.

The mode setting unit 26G receives a mode setting signal input to the imaging device by a user or an automatic mode setting signal incorporated in the imaging device, and holds a mode indicating a phase resolution of the stepping motor 104. For example, the mode setting unit 26G can be configured as a circuit including a register.

Figure 4:
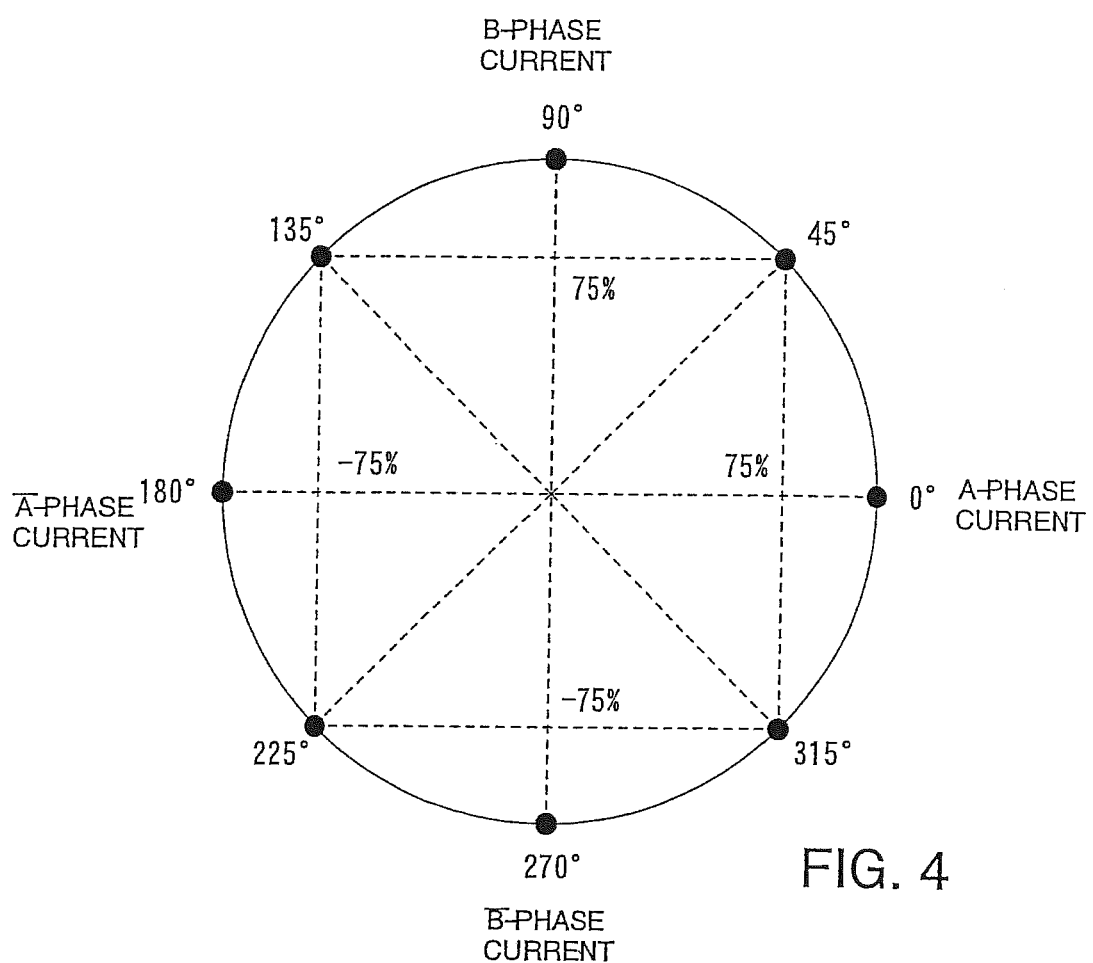
FIG. 4 illustrates a phase relationship in a stepping motor control performed in units of $\frac{1}{8}^{th}$ of a rotation.
Figure 5:
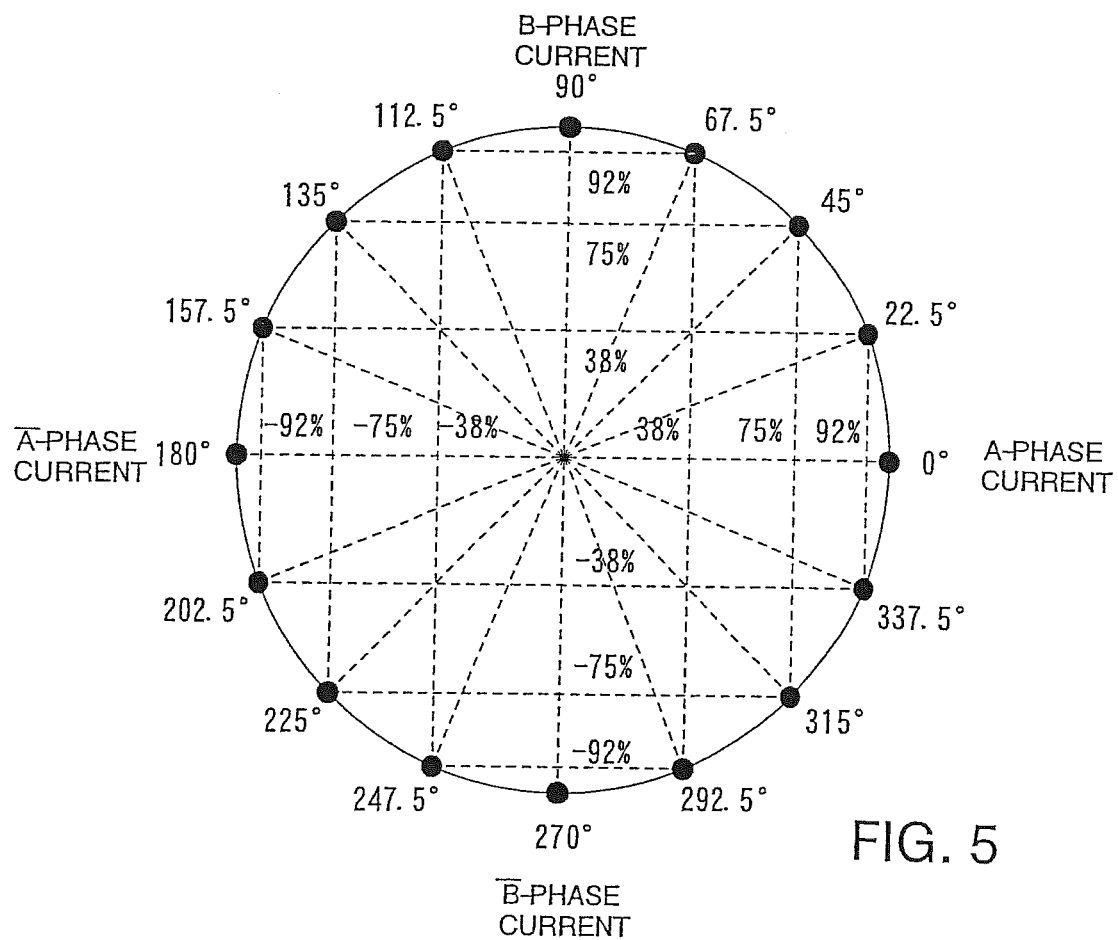
FIG. 5 illustrates a phase relationship in a stepping motor control performed in units of $\frac{1}{16}^{th}$ of a rotation

The phase resolution of the stepping motor 104 represents the number of steps to be used to control one complete rotation of the stepping motor 104. For example, according to the mode for controlling one complete rotation of the stepping motor 104 in units of $\frac{1}{8}^{th}$ of a rotation (45°) as illustrated in FIG. 4, the phase resolution of the stepping motor 104 is equal to eight phases. Further, according to the mode for controlling one complete rotation of the stepping motor 104 in units of 1/16th of a rotation (22.5°) as illustrated in FIG. 5, the phase resolution of the stepping motor 104 is equal to sixteen phases.

The A-phase dedicated pulse generation module 26E receives the phase information output from the phase management/update module 26B, the counter value output from the PWM counter 26D, and the mode having been set in the mode setting unit 26G. The A-phase dedicated pulse generation module 26E generates and outputs a pulse signal to be supplied to an A-phase of the stepping motor 104 based on the received information. On the other hand, the B-phase dedicated pulse generation module 26F receives the phase information output from the phase management/update module 26B, the counter value output from the PWM counter 26D, and the mode having been set in the mode setting unit 26G. The B-phase dedicated pulse generation module 26F generates and outputs a pulse signal to be supplied to a B-phase of the stepping motor 104 based on the received information.

In a case where the phase (rotational angle) of the stepping motor 104 is controlled based on a set of pulse signals output to the A-phase and the B-phase respectively, the A-phase dedicated pulse generation module 26E and the B-phase dedicated pulse generation module 26F generate and output pulse signals corresponding to the phase information input from the phase management/update module 26B. The current to be supplied to an A-phase coil of the stepping motor 104 can be represented by (A-phase-1)-(A-phase-2). Further, the current to be supplied to a B-phase coil of the stepping motor 104 can be represented by (B-phase-1)-(B-phase-2).

In the present embodiment, pulse width modulation can be performed on the pulse signals to be generated by the A-phase dedicated pulse generation module 26E and the B-phase dedicated pulse generation module 26F according to the mode set in the mode setting unit 26G.

First, the mode for controlling one complete rotation of the stepping motor 104 in units of $1/8^{th}$ of a rotation (45°) is described below. The A-phase dedicated pulse generation module 26E and the B-phase dedicated pulse generation module 26F perform the following processing in a case where the mode set in the mode setting unit 26G is the mode for controlling the stepping motor 104 at eight phases.

Figure 6:
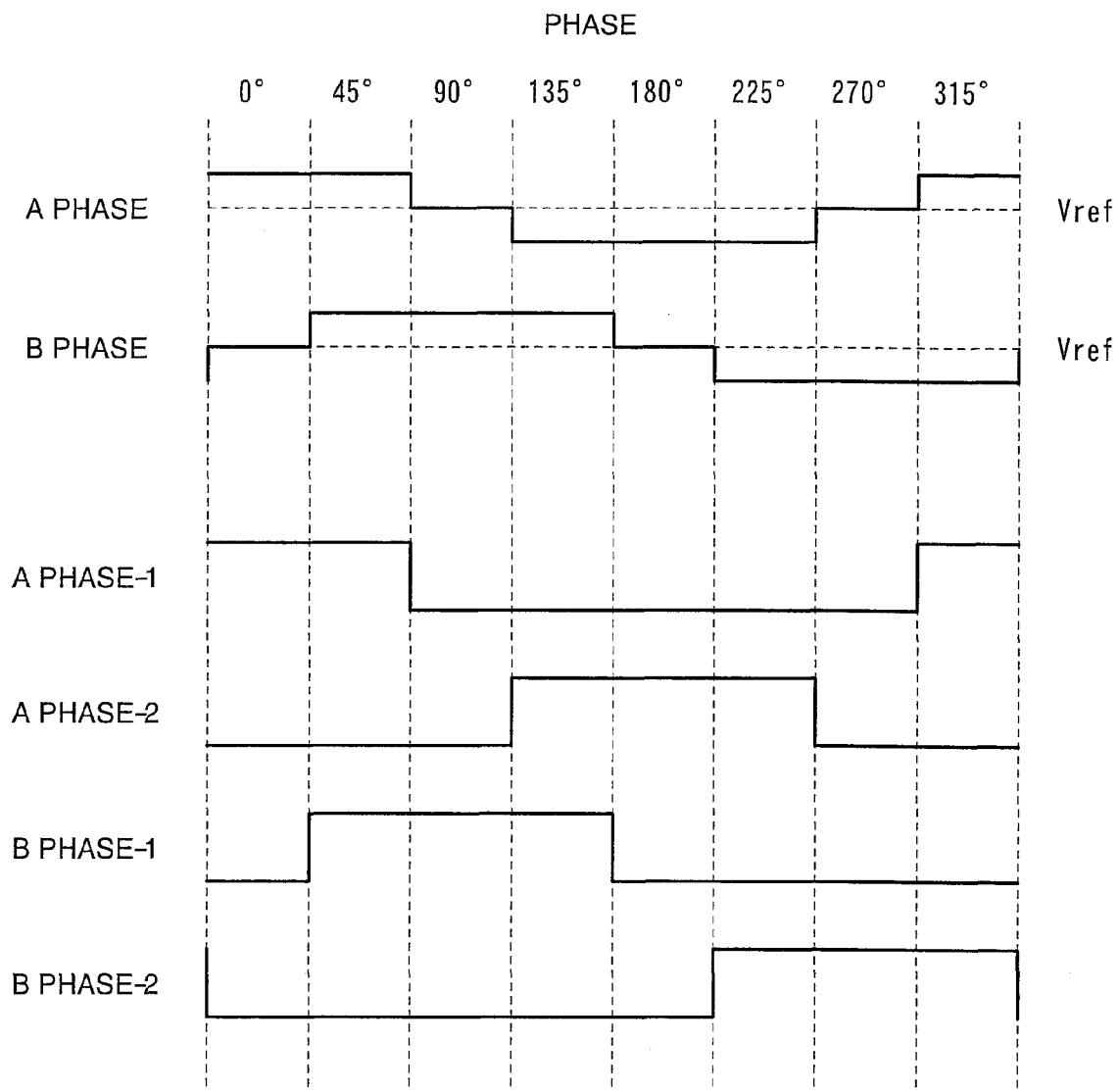
FIG. 6 illustrates an example of a combination of pulse signals supplied to the stepping motor at respective phases in the stepping motor control performed in units of $\frac{1}{8}^{th}$ of a rotation according to an embodiment of the present invention.

In the case where one complete rotation of the stepping motor 104 is controlled at eight phases (0°, +45°, +90°, +135°, +180°, +225°, +270°, +315°) as illustrated in FIG. 4, the A-phase dedicated pulse generation module 26E and the B-phase dedicated pulse generation module 26F control the A-phase and B-phase currents of the stepping motor 104 based on the phase (rotational angle) of the stepping motor and a combination of A-phase-1, A-phase-2, B-phase-1, and B-phase-2 pulse signals illustrated in FIG. 6. The phase (rotational angle) of the stepping motor and the combination of the A-phase-1, A-phase-2, B-phase-1, and B-phase-2 pulse signals illustrated in FIG. 6 can be stored and held beforehand in the waveform register set 26C. In FIG. 6, the abscissa axis represents the phase (rotational angle) of the stepping motor and the ordinate axis represents the intensity of the pulse signal of each phase.

For example, it is assumed that the driving step number received by the phase management/update module 26B is 1 and the present phase stored in the internal register is +90°. First of all, the phase management/update module 26B sets the internal register value to +135° and outputs the set value to the A-phase dedicated pulse generation module 26E and the B-phase dedicated pulse generation module 26F. In response to the set value received from the phase management/update module 26B, the A-phase dedicated pulse generation module 26E generates and outputs a set of pulse signals to be supplied to the A-phase coil based on the relationship between the phase and the combination of pulse signals that are stored in the waveform register set 26C. In this case, the A-phase dedicated pulse generation module 26E generates and outputs a low-level pulse signal to be supplied to the A-phase-1 until the counter value output from the PWM counter 26D changes from 0 to 255. Further, the A-phase dedicated pulse generation module 26E generates and outputs a high-level pulse signal to the A-phase-2 until the counter value output from the PWM counter 26D changes from 0 to 255. On the other hand, the B-phase dedicated pulse generation module 26F generates and outputs a high-level pulse signal to the B-phase-1 until the counter value output from the PWM counter 26D changes from 0 to 255. Further, the B-phase dedicated pulse generation module 26F generates and outputs a low-level pulse signal to the B-phase-2 until the counter value output from the PWM counter 26D changes from 0 to 255. The A-phase dedicated pulse generation module 26E and the B-phase dedicated pulse generation module 26F repetitively output the pulse signals until a driving operation of the stepping motor 104 is completed.

As described above, the phase of the stepping motor 104 advances from +90° to +135° in one step. In a case where another phase is set, the A-phase dedicated pulse generation module 26E and the B-phase dedicated pulse generation module 26F can generate and output the pulse signals based on the relationship between the phase and the combination of pulse signals that is stored in the waveform register set 26C.

Next, the mode for controlling one complete rotation of the stepping motor 104 in units of $1/16^{th}$ of a rotation (22.5°) is described below. The A-phase dedicated pulse generation module 26E and the B-phase dedicated pulse generation module 26F perform the following processing in a case where the mode set in the mode setting unit 26G is the mode for controlling the stepping motor 104 at sixteen phases.

Figure 7:
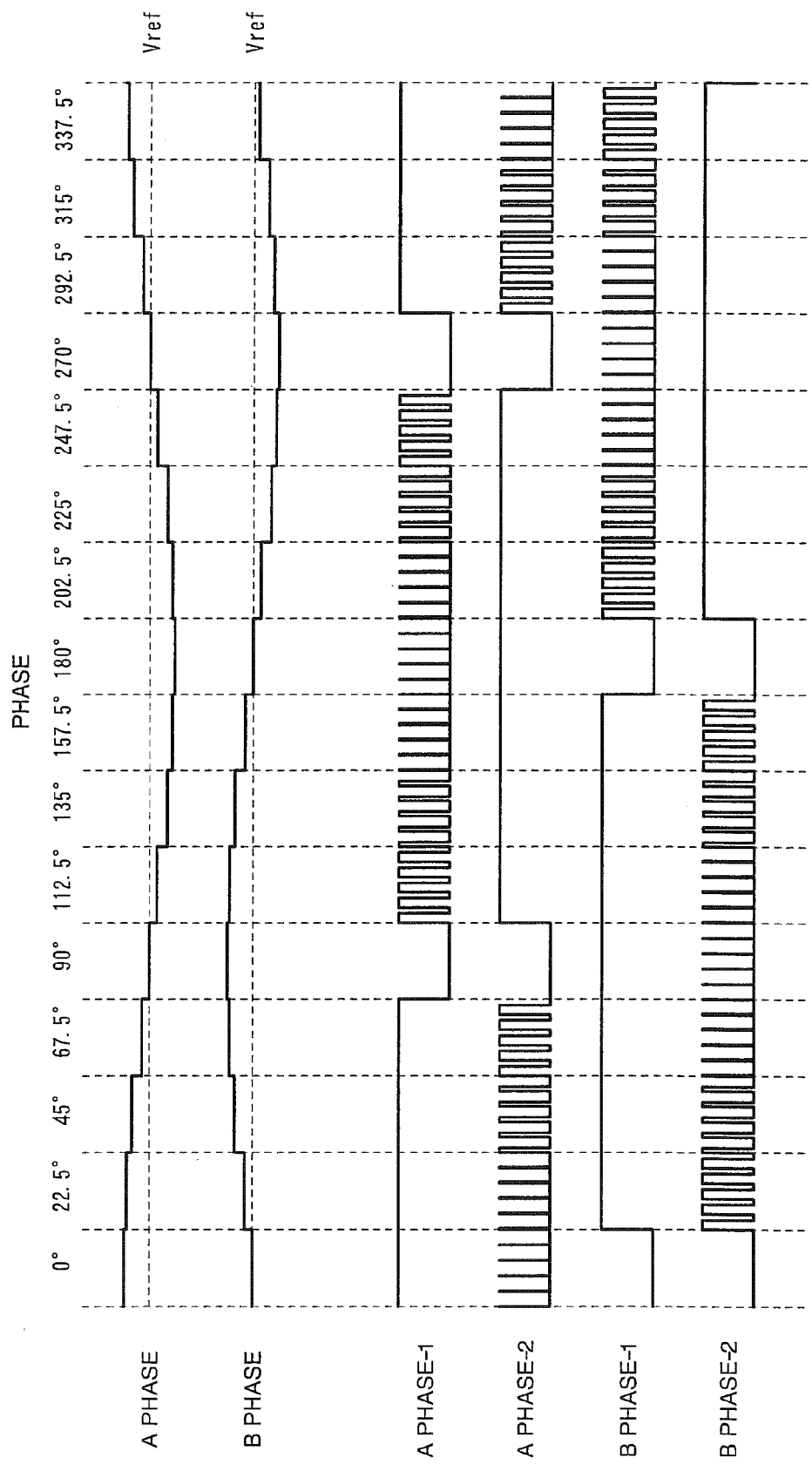
FIG. 7 illustrates an example of a combination of pulse signals supplied to the stepping motor at respective phases in the stepping motor control performed in units of $\frac{1}{16}^{th}$ of a rotation according to an embodiment of the present invention.

In the case where one complete rotation of the stepping motor 104 is controlled at sixteen phases (0°, +22.5°, +45°, +67.5°, +90°, +112.5°, +135°, +157.5°, +180°, +202.5°, +225°, +247.5°, +270°, +292.5°, +315°, +337.5°) as illustrated in FIG. 5, the A-phase dedicated pulse generation module 26E and the B-phase dedicated pulse generation module 26F control the A-phase and B-phase currents of the stepping motor 104 based on the phase (rotational angle) of the stepping motor and a combination of A-phase-1, A-phase-2, B-phase-1, and B-phase-2 pulse signals illustrated in FIG. 7. The phase (rotational angle) of the stepping motor and the combination of the A-phase-1, A-phase-2, B-phase-1, and B-phase-2 pulse signals illustrated in FIG. 7 can be stored and held beforehand in the waveform register set 26C. In FIG. 7, the abscissa axis represents the phase (rotational angle) of the stepping motor and the ordinate axis represents the intensity of the pulse signal of each phase.

FIG. 8 illustrates examples of A-phase and B-phase current values (ratio) corresponding to each phase and a combination of A-phase-1, A-phase-2, B-phase-1, and B-phase-2 that can realize the A-phase and B-phase current values. For example, control for setting the phase of the stepping motor 104 to 0° can be realized by setting the A-phase current flowing through the A-phase coil to be positive 100% and setting the B-phase current flowing through the B-phase coil to be 0%. More specifically, the control can be performed by selecting a combination of the A-phase-1 set to 100% and the A-phase-2 set to 0% and a combination of the B-phase-1 set to 0% and the B-phase-2 set to 0%. Further, control for setting the phase of the stepping motor 104 to +22.5° can be realized by setting the A-phase current flowing through the A-phase coil to be positive 92% and setting the B-phase current flowing through the B-phase coil to be positive 38%. More specifically, the control can be performed by selecting a combination of the A-phase-1 set to 100% and the A-phase-2 set to 8% and a combination of the B-phase-1 set to 100% and the B-phase-2 set to 62%. Similar settings can be performed for other phases. The pulse width modulation can be performed on the A-phase-1, A-phase-2, B-phase-1, and B-phase-2 to adjust a ratio (on duty) of a period during which the signal level is high and a period during which the signal level is low and control the intensity of an average pulse.

More specifically, it is assumed that the driving step number received by the phase management/update module 26B is 2 and the present phase stored in the internal register is +90°. First, the phase management/update module 26B sets the internal register value to +112.5° and outputs the set value to the A-phase dedicated pulse generation module 26E and the B-phase dedicated pulse generation module 26F. In response to the set value received from the phase management/update module 26B, the A-phase dedicated pulse generation module 26E generates and outputs a set of pulse signals to be supplied to the A-phase coil based on the relationship between the phase and the combination of pulse signals that are stored in the waveform register set 26C. In this case, the A-phase dedicated pulse generation module 26E generates a pulse width modulated pulse signal whose signal level is high until the counter value output from the PWM counter 26D changes from 0 to 158 and is low until the counter value changes from 158 to 255, and outputs the generated pulse signal to the A-phase-1. The pulse signal generated in this case is a pulse signal having an on duty of 62%. Further, the A-phase dedicated pulse generation module 26E generates and outputs a high-level pulse signal to the A-phase-2 until the counter value output from the PWM counter 26D changes from 0 to 255. Thus, the current flowing through the A-phase coil of the stepping motor 104 can be set to negative 38% (=62%–100%). On the other hand, the B-phase dedicated pulse generation module 26F generates and outputs a high-level pulse signal to the B-phase-1 until the counter value output from the PWM counter 26D changes from 0 to 255. Further, the B-phase dedicated pulse generation module 26F generates a pulse width modulated pulse signal whose signal level is high until the counter value output from the PWM counter 26D changes from 0 to 20 and is low until the counter value changes from 21 to 255, and outputs the generated pulse signal to the B-phase-2. The pulse signal generated in this case is a pulse signal having an on duty of 8%. Thus, the current flowing through the B-phase coil of the stepping motor 104 can be set to positive 92% (=100%–8%). In this state, the phase (rotational angle) of the stepping motor 104 can be controlled to +112.5°. The A-phase dedicated pulse generation module 26E and the B-phase dedicated pulse generation module 26F repetitively output the pulse signals until a driving operation of the stepping motor 104 is completed.

Next, the phase management/update module 26B sets the internal register value to +135° by advancing the phase by one step and outputs the set value to the A-phase dedicated pulse generation module 26E and the B-phase dedicated pulse generation module 26F.

In response to the set value received from the phase management/update module 26B, the A-phase dedicated pulse generation module 26E generates a pulse width modulated pulse signal whose signal level is high until the counter value output from the PWM counter 26D changes from 0 to 74 and is low until the counter value changes from 75 to 255, and outputs the generated pulse signal to the A-phase-1. The pulse signal generated in this case is a pulse signal having an on duty of 29%. Further, the A-phase dedicated pulse generation module 26E generates and outputs a high-level pulse signal to the A-phase-2 until the counter value output from the PWM counter 26D changes from 0 to 255. Thus, the current flowing through the A-phase coil of the stepping motor 104 can be set to negative 71% (=29%–100%). On the other hand, the B-phase dedicated pulse generation module 26F generates and outputs a high-level pulse signal to the B-phase-1 until the counter value output from the PWM counter 26D changes from 0 to 255. Further, the B-phase dedicated pulse generation module 26F generates a pulse width modulated pulse signal whose signal level is high until the counter value output from the PWM counter 26D changes from 0 to 74 and is low until the counter value changes from 75 to 255, and outputs the generated pulse signal to the B-phase-2. The pulse signal generated in this case is a pulse signal having an on duty of 29%. Thus, the current flowing through the B-phase coil of the stepping motor 104 can be set to positive 71% (=100%–29%). In this state, the phase (rotational angle) of the stepping motor 104 can be controlled to +135°. The A-phase dedicated pulse generation module 26E and the B-phase dedicated pulse generation module 26F repetitively output the pulse signals until a driving operation of the stepping motor 104 is completed.

Similarly, for each of other phases, the A-phase dedicated pulse generation module 26E and the B-phase dedicated pulse generation module 26F can generate and output a combination of A-phase-1, A-phase-2, B-phase-1, and B-phase-2 pulse signals illustrated in FIG. 8 based on pulse width modulation performed on the A-phase-1, A-phase-2, B-phase-1, and B-phase-2.

The stepping motor 104 receives the pulse signal output from the stepping control unit 26 and rotates its rotor to a phase (rotational angle) corresponding to the pulse signal. The rotor of the stepping motor 104 is connected to a mechanism (e.g., a ball screw) that is capable of driving the lens 106. Thus, the position of the lens 106 is variable according to the rotation of the stepping motor 104. The above-described mechanism can reduce an adverse influence on the image capturing operation that may be caused by a vibration component of the imaging device.

Further, the ADC 20, the gyro filter 22, and the stepping control unit 26 can be integrated as a logic circuit. The logic circuit is useful in downsizing the vibration compensation circuit 100 as well as in increasing the processing speed of the vibration compensation circuit 100. Further, the logic circuit is useful to reduce the processing burden of the CPU incorporated in the imaging device.

In a case where the driving step number received by the phase management/update module 26B is equal to or greater than 2, it is desired to change the pulse signals on a step-by-step basis. More specifically, as described in the case where the stepping motor 104 is controlled in units of $\frac{1}{16}^{th}$ of a rotation, if the present phase of the stepping motor 104 is +90° and the stepping motor 104 is rotated by an amount corresponding to two steps, it is desired to change the A-phase and B-phase pulse signals of +90° to A-phase and B-phase pulse signals of +135° via A-phase and B-phase pulse signals of +112.5°. The above-described step-by-step change of the pulse signals is useful in that driving noise generated from the stepping motor 104 becomes smaller compared to a case where the A-phase and B-phase pulse signals of +90° are directly changed to the A-phase and B-phase pulse signals of +135°. If the stepping motor 104 generates large driving noise during a camera-shake correction operation when a user operates an imaging device including a camera-shake correction function, the user may mistakenly believe that the imaging device has malfunctioned. Therefore, suppressing the driving noise generated from the stepping motor 104 is useful to enable users of the imaging device to use the camera-shake correction function without causing any misunderstanding.

Although the configuration described in the above-described embodiment is for driving the lens 106 in one axis (X-axis) direction, a similar configuration can be employed in a case where the lens 106 is driven in another axis (e.g., Y-axis perpendicular to the X-axis) direction.

Further, the configuration described in the present embodiment can be applied to any component other than the lens 106, if the component is driven to eliminate an influence caused by the vibration of an imaging device. For example, instead of moving the lens 106, it is useful to move an image sensor (e.g., a CCD or a CMOS) to compensate the vibration of the imaging device.

Further, the mode described in the present embodiment is for controlling one complete rotation of the stepping motor 104 in units of $1/8^{th}$ of a rotation or in units of $1/16^{th}$ of a rotation. However, the rotational control of the stepping motor is not limited to the above-described two modes and therefore any other control based on a different phase number can be similarly performed.

Figure 10:
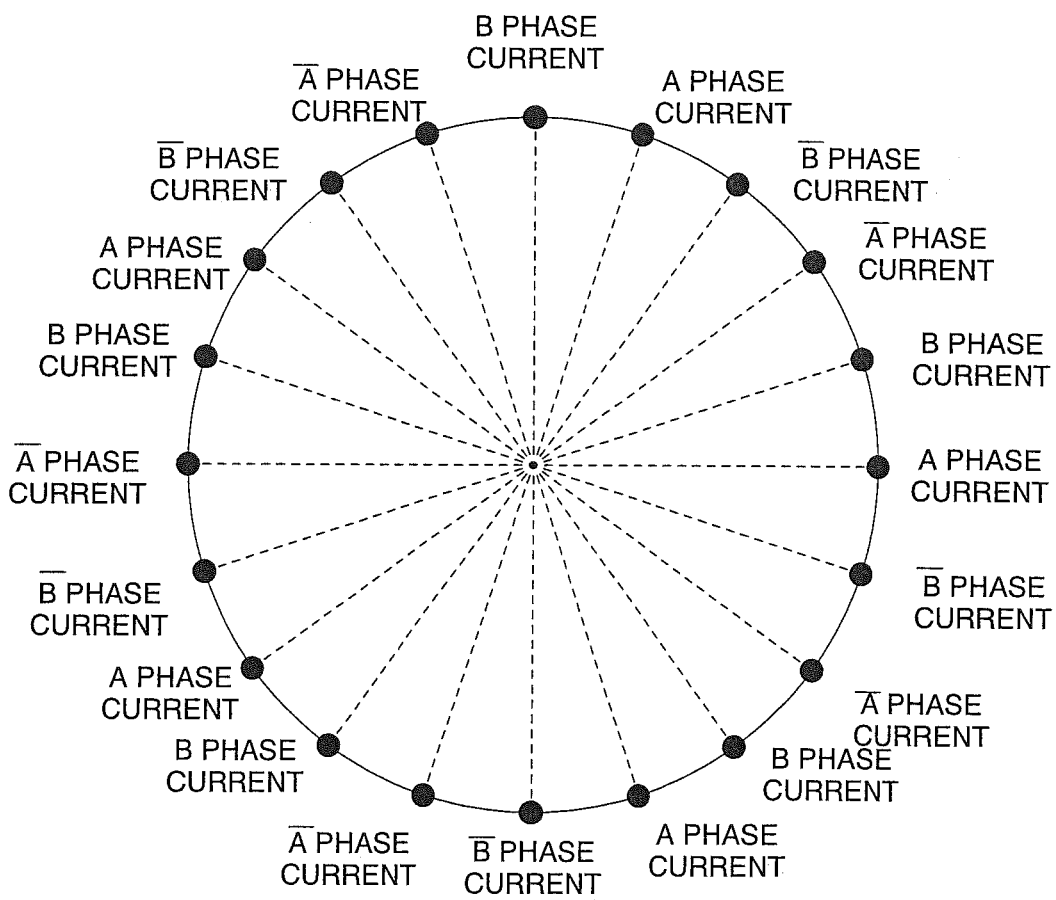
FIG. 10 illustrates a phase relationship in a stepping motor control, in which A-phase current, B-phase current, inversion of A-phase current, and inversion of B-phase current are repeated at angular intervals of 18°.

Further, the current phase relationship of the stepping motor 104 is not limited to the example illustrated in FIG. 4, according to which the A-phase current, the B-phase current, inversion of the A-phase current, and inversion of the B-phase current are angularly spaced at intervals of 90°. For example, FIG. 10 illustrates another current phase relationship of the stepping motor 104, according to which the A-phase current, the B-phase current, inversion of the A-phase current, and inversion of the B-phase current are repetitively disposed at angular intervals of 18°. The current phase relationship illustrated in FIG. 10 can be preferably used to finely control the rotational angle of the stepping motor 104.

<Modified Embodiment>

Further, the phase of the stepping motor 104 can be determined by a ratio of the currents flowing through the A-phase and B-phase coils. Therefore, the duty values of the pulse signals supplied to the A-phase-1, A-phase-2, B-phase-1, and B-phase-2 can be differentiated from the values illustrated in FIG. 8. More specifically, it is useful to change a ratio (on duty) of a period during which the pulse signal becomes a high-level signal to a period during which the pulse signal becomes a low-level signal so as to prevent the ratio of the currents flowing through the A-phase and the B-phase coils from changing at the same phase of the stepping motor 104.

For example, in a case where the phase is controlled to 0°, if the current flowing through the B-phase coil is 0, it is desired that the current flowing through the A-phase coil can generate a sufficient amount of torque. In a case where the phase is controlled to +22.5°, it is desired that the ratio of the current flowing through the A-phase coil to the current flowing through the B-phase coil is equal to 92:38.

Hence, it is useful that the mode setting unit 26G can set a mode for changing the maximum duty of a pulse signal in addition to the mode for changing the phase number so that the A-phase dedicated pulse generation module 26E and the B-phase dedicated pulse generation module 26F can change the duty value of each pulse signal according to the set mode. More specifically, a PWM modulation circuit included in each of the A-phase dedicated pulse generation module 26E and the B-phase dedicated pulse generation module 26F can adjust the duty value of each pulse signal by changing the period during which the pulse signal becomes a high-level based on the counter value output from the PWM counter 26D according to the set mode of the mode setting unit 26G.

In the above-described embodiment, as illustrated in FIG. 8, the maximum values of the A-phase and B-phase currents were set to be 100%. FIG. 9 illustrates another example of the setting data, according to which the maximum values of the A-phase and B-phase currents are set to 50%.

Figures 11A, 11B:
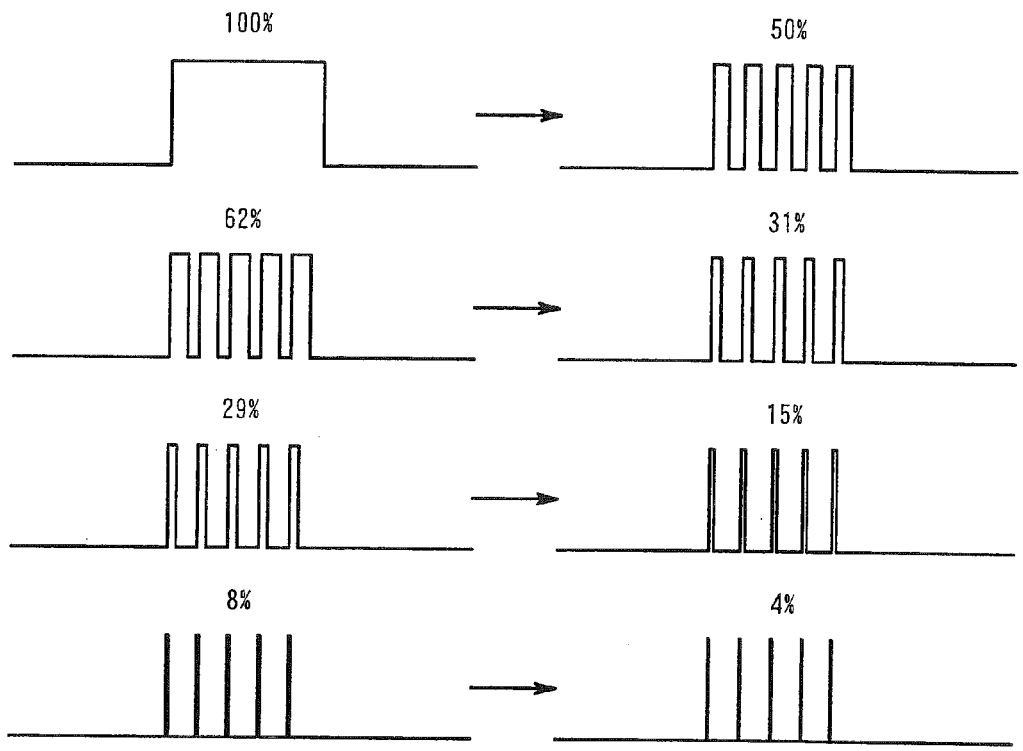
FIGS. 11 (A) and 11 (B) illustrate pulse width modulated pulse signals according to the modified embodiment.

Further, FIG. 11(*a*) illustrates a relationship of representative pulse signals in a case where the maximum on duty is equal to 100%. FIG. 11(*b*) illustrates another relationship of representative pulse signals in a case where the maximum on duty is equal to 50%. The off duty of each pulse signal decreases according to a reduction amount in the maximum on duty.

For example, in a case where the phase management/update module 26B outputs a phase value+112.5° to the A-phase dedicated pulse generation module 26E and the B-phase dedicated pulse generation module 26F, the A-phase dedicated pulse generation module 26E generates a pulse width modulated pulse signal whose signal level is high until the counter value output from the PWM counter 26D changes from 0 to 206 and is low until the counter value changes from 206 to 255, and outputs the generated pulse signal to the A-phase-1. The pulse signal generated in this case is a pulse signal having an off duty of 19%. Further, the A-phase dedicated pulse generation module 26E generates a high-level pulse width modulated pulse signal until the counter value output from the PWM counter 26D changes from 0 to 255 and outputs the generated pulse signal to the A-phase-2. The pulse signal generated in this case is a pulse signal having an off duty of 0%. Thus, the current flowing through the A-phase coil of the stepping motor 104 can be set to negative 19% (=−19%–0%). On the other hand, the B-phase dedicated pulse generation module 26F generates a high-level pulse width modulated pulse signal until the counter value output from the PWM counter 26D changes from 0 to 255 and outputs the generated pulse signal to the B-phase-1. The pulse signal generated in this case is a pulse signal having an off duty of 0%. Further, the B-phase dedicated pulse generation module 26F generates a pulse width modulated pulse signal whose signal level is high until the counter value output from the PWM counter 26D changes from 0 to 137 and is low until the counter value changes from 137 to 255 and outputs the generated pulse signal to the B-phase-2. The pulse signal generated in this case is a pulse signal having an off duty of 46%. Thus, the current flowing through the B-phase coil of the stepping motor 104 can be set to positive 46% (=0%–(−46%)). In this state, the phase (rotational angle) of the stepping motor 104 can be controlled to +112.5°.

Similarly, for each of other phases, the A-phase dedicated pulse generation module 26E and the B-phase dedicated pulse generation module 26F can modulate the pulse widths of the A-phase-1, A-phase-2, B-phase-1, and B-phase-2 pulse signals so as to prevent the ratio of the currents flowing through the A-phase and B-phase coils from changing, as illustrated in FIGS. 9 and 11(*b*).

Figure 12:
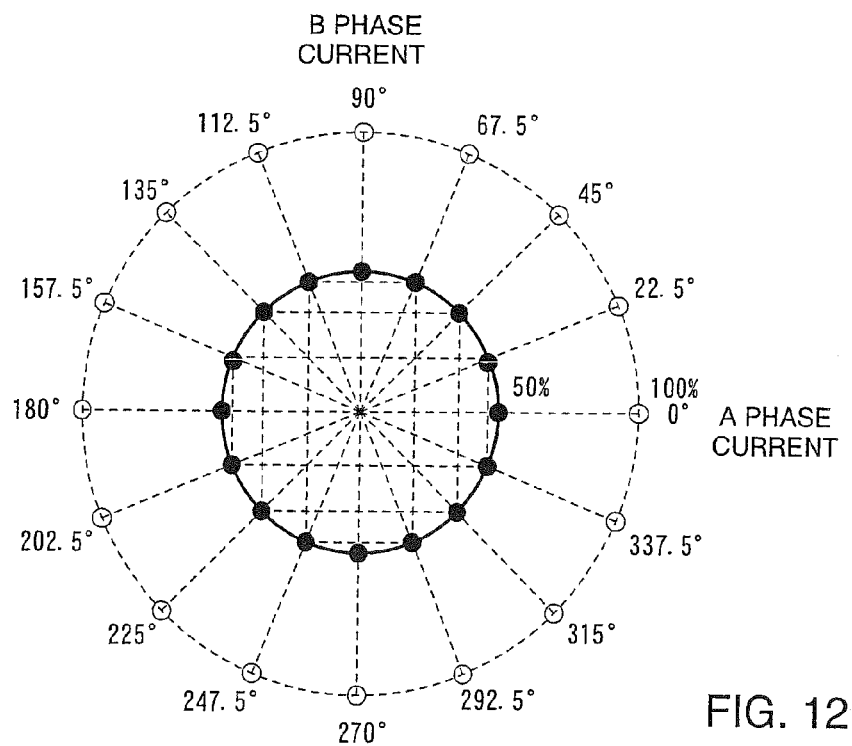
FIG. 12 illustrates current values at respective phases in the stepping motor control performed in units of $\frac{1}{16}^{th}$ of a rotation according to the modified embodiment.
Figure 13:
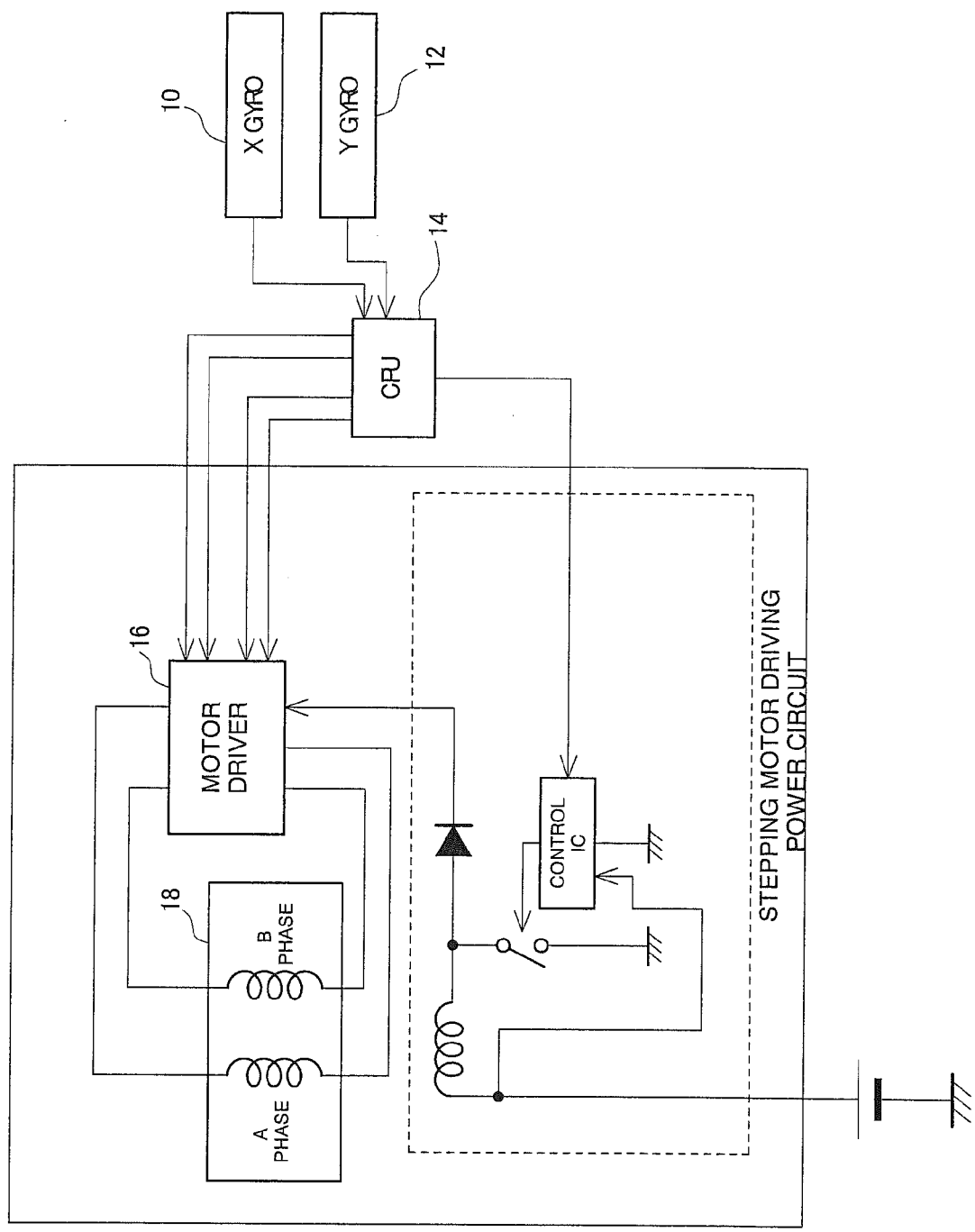
FIG. 13 illustrates a configuration of a conventional vibration compensation circuit.

In a case where the maximum value of the current is set to 50%, as illustrated by a solid line in FIG. 12, the current to be supplied to the stepping motor 104 can be reduced to a 50% level compared to the case where the maximum on duty is equal to 100%. As described above, the adjustment for the stepping motor 104 with respect to its output torque and electrical power consumption can be performed by changing the duty values of respective pulse signals so as to prevent the ratio of currents flowing through respective phase coils of the stepping motor 104 from changing. In a case where the stepping motor 104 requires a higher output torque, the adjustment can be performed so as to increase the maximum on duty of each pulse signal. In a case where it is desired to reduce the electrical power consumption by the stepping motor 104, the adjustment can be performed so as to decrease the maximum on duty of each pulse signal.

As described in the modified embodiment of the present embodiment, in a case where the currents supplied to the A-phase and B-phase coils of the stepping motor 104 are reduced to the 50% level, it is desired to maintain one pulse signal at the high level (100%) while changing the off duty of the other pulse signal for each of the A-phase and the B-phase. Maintaining either one of two pulse signals at the high level is effective to prevent both of the A-phase-1 and the A-phase-2, or both of the B-phase-1 and the B-phase-2, from becoming lower at the same time. The linearity between the duty value and the current amount deteriorates according to the length of a period during which two pulse signals become lower at the same time. Therefore, even in a case where the control of the off duty is correctly performed, the amount of output current may deviate from a target value. In this respect, the control for maintaining either one of two pulse signals at the high level is useful to assure the linearity between the duty value and the current amount.

The invention claimed is:

1. A vibration compensation circuit that causes a stepping motor to drive an optical component or an image sensor of an imaging device according to a state of vibration so as to reduce an influence of the vibration on an image capturing operation, the vibration compensation circuit comprising:
    an analog/digital conversion unit that converts a vibration detection signal output from a vibration detection element capable of detecting a vibrating state of the imaging device into a digital signal;
    a gyro filter that generates a moving amount of the imaging device based on the vibration detection signal digitalized by the analog/digital conversion unit;
    a rotation control unit that generates a driving amount of the optical component or the image sensor based on a present position of the optical component or the image sensor and the moving amount generated by the gyro filter; and
    a stepping control unit that generates a control signal to be used to control the stepping motor based on the driving amount generated by the rotation control unit and outputs the generated control signal,
    wherein the analog/digital conversion unit, the gyro filter, and the stepping control unit are integrated as a logic circuit.

2. The vibration compensation circuit according to claim 1, wherein
    the stepping control unit includes:
    a phase managing unit that reads a present rotational phase of the stepping motor;
    a control signal generation unit that generates the control signal based on the phase read by the phase managing unit and the driving amount.

3. The vibration compensation circuit according to claim 1, wherein
    the stepping control unit is constituted by two or more units, and
    the two or more stepping control units are independently operable to control stepping motors that operate in mutually intersectional directions.

4. A vibration compensation circuit that causes a stepping motor to drive an optical component or an image sensor of an imaging device according to a state of vibration so as to reduce an influence of the vibration on an image capturing operation, the vibration compensation circuit comprising:
    an analog/digital conversion unit that converts a vibration detection signal output from a vibration detection element capable of detecting a vibrating state of the imaging device into a digital signal;
    a gyro filter that obtains a moving amount of the imaging device based on the vibration detection signal digitalized by the analog/digital conversion unit;
    a rotation control unit that generates a rotational driving amount of the stepping motor based on a present position of the optical component or the image sensor and the moving amount obtained by the gyro filter; and
    a stepping control unit that generates a control signal to be used to control the stepping motor according to the rotational driving amount generated by the rotation control unit and outputs the generated control signal,
    wherein the stepping control unit generates and outputs the control signal to drive the stepping motor at different phase resolution levels.

5. The vibration compensation circuit according to claim 4, wherein the stepping control unit generates and outputs the control signal according to a phase resolution switching signal of the stepping motor, in which a combination of a plurality of signals has been changed with respect to each rotational phase of the stepping motor.

6. The vibration compensation circuit according to claim 4, wherein the stepping control unit generates and outputs a pulse width modulated signal as the control signal.

7. A vibration compensation circuit that causes a stepping motor to drive an optical component or an image sensor of an imaging device according to a state of vibration so as to reduce an influence of the vibration on an image capturing operation, the vibration compensation circuit comprising:
    an analog/digital conversion unit that converts a vibration detection signal output from a vibration detection element capable of detecting a vibrating state of the imaging device into a digital signal;
    a gyro filter that obtains a moving amount of the imaging device based on the vibration detection signal digitalized by the analog/digital conversion unit;
    a rotation control unit that generates a rotational driving amount of the stepping motor based on a present position of the optical component or the image sensor and the moving amount obtained by the gyro filter; and
    a stepping control unit that generates a pulse signal to be used to drive and rotate the stepping motor to each phase according to the rotational driving amount generated by the rotation control unit and outputs the generated pulse signal,
    wherein the stepping control unit can perform pulse width modulation to change a ratio of a period during which the pulse signal becomes a high-level signal to a period during which the pulse signal becomes a low-level signal with respect to the same phase of the stepping motor.

8. The vibration compensation circuit according to claim 7, wherein the stepping motor includes a plurality of coils so that a rotational phase of the stepping motor is controlled by a ratio of currents flowing through the plurality of coils,
    the pulse signal generated by the stepping control unit determines a value of the current flowing through each of the plurality of coils, and
    the stepping control unit can change a ratio of a period during which the pulse signal becomes a high-level signal to a period during which the pulse signal becomes a low-level signal so that the ratio of the currents flowing through the plurality of coils does not change with respect to the same phase of the stepping motor.

9. The vibration compensation circuit according to claim 7, wherein the stepping control unit generates and outputs two pulse signals with respect to one phase of the stepping motor, and controls the stepping motor to rotate to each phase according to a difference between the two pulse signals.

10. The vibration compensation circuit according to claim 8 wherein the stepping control unit generates and outputs two pulse signals with respect to one phase of the stepping motor, and controls the stepping motor to rotate to each phase according to a difference between the two pulse signals.

* * * * *